UNITED STATES PATENT OFFICE.

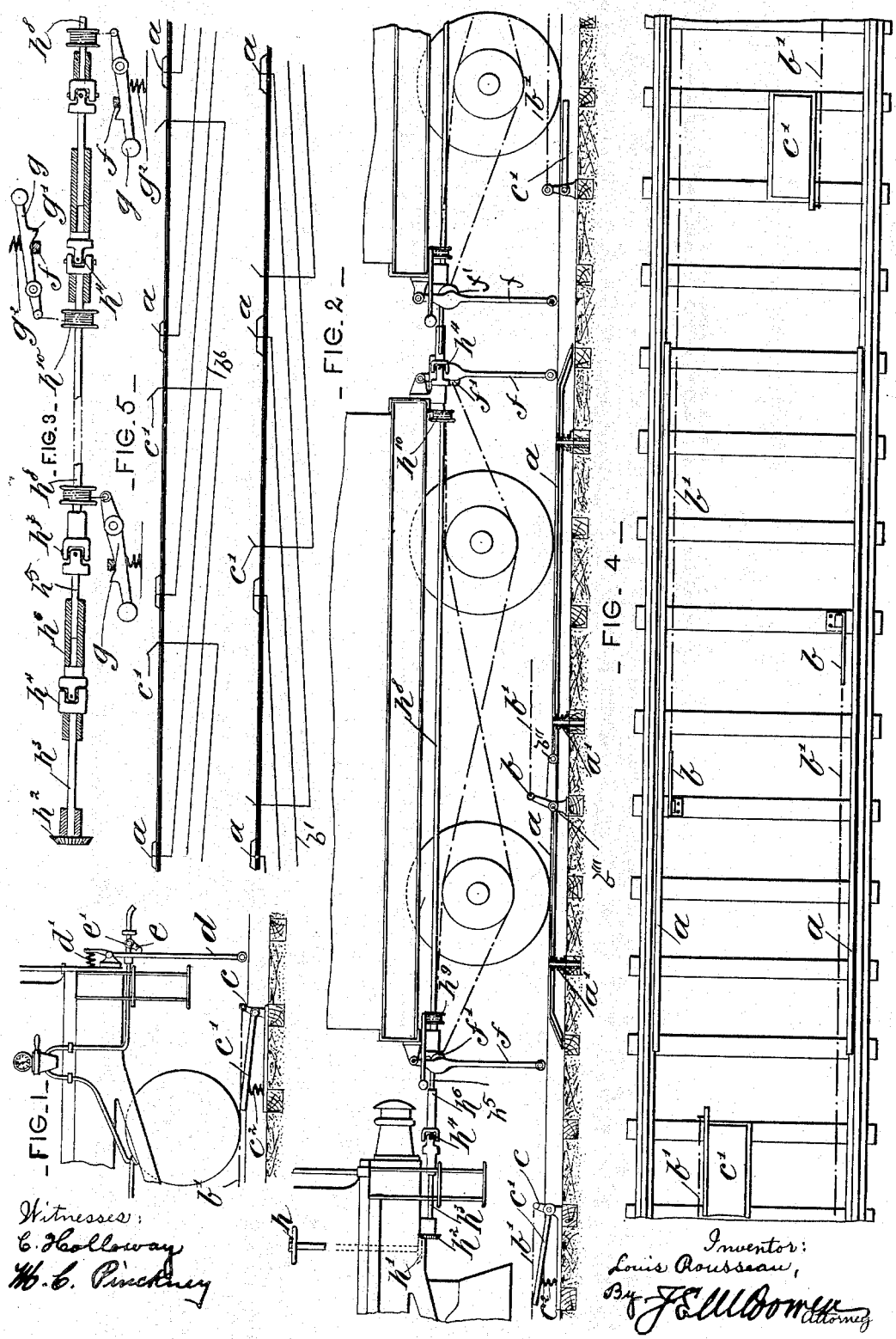

LOUIS ROUSSEAU, OF PARIS, FRANCE.

SYSTEM OF AUTOMATIC STOPPAGE OF RAILWAY-TRAINS.

SPECIFICATION forming part of Letters Patent No. 647,611, dated April 17, 1900.

Application filed November 7, 1899. Serial No. 736,179. (No model.)

*To all whom it may concern:*

Be it known that I, LOUIS ROUSSEAU, manufacturer, a citizen of the Republic of France, residing at 56 Rue St. Sabin, Paris, France, have invented a certain new and useful System of Automatic Stoppage of Railway-Trains, Preventing Bumpings and Collisions, of which the following is a specification.

This invention has for its object a mechanical system working automatically by the passage of a train and causing to rise in front and behind this train at a convenient distance some studs, which actuate the brakes of the trains going too near the first in front or behind on the same rails, these latter trains causing the stoppage of the first train by the same mechanism. This system can be used for any trains, whatever the kind of brake fitted up may be.

In the accompanying drawings, Figure 1 is an elevation of the hind part of an engine fitted up with this system for stoppage of trains when the carriages of the train have the Westinghouse brakes or others of a similar kind. Fig. 2 is a view like Fig. 1, but for trains fitted up with a system of brakes with cables. Fig. 3 is a view showing in plan details of the latter brake apparatus. Fig. 4 is a view showing in plan a portion of the road fitted up according to the invention. Fig. 5 is a general diagram of the system.

At equal distances along both rails of the line pedals $a$ $a$ are located by groups of two facing each other, resting on springs $a'$ $a'$ and normally being at the same level as the corresponding rails. On each pedal is mounted a bent lever $b$, connected by a cable $b'$ to another lever $c$, fixed on the axis of a stud $c'$, which a spring $c^2$ always tends to keep up. The pedal $a$ on the left side actuates a stud $c'$ placed in the front, and the pedal on the right side actuates a stud $c'$ placed in the hind part.

In the case of a train fitted up with the Westinghouse air-brake the engine carries a lever $d$, which when moved on its pivot operates the valve or tap $e'$ in the brake-pipe of the train. The lever and the valve constitute means on the train for operating the brake when the lever coöperates with a stud $c'$.

In the case of a train fitted up with brakes with cables each carriage carries a lever $f$ in front and behind, and on each lever is mounted a pulley $f'$, on which one of the two cables of the brake is wound. These cables are wound on drums mounted on the axles of the carriages in such a way that when they are tightened they press the shoes of the brakes against the wheels. Said lever, together with the pulleys $f'$ and brake-cables, forms means on the train for operating its brakes.

When a train reaches a pedal $a$, the flanges of the wheels lower this pedal by compressing the springs $a'$ and oscillate the angle-lever $b$, which is connected to the pedal at $b''$ and pivoted at $b'''$. The cable $b'$ connected to this lever slackens, and the spring $c^2$ of the stud $c'$ connected with the said pedal raises this stud $c'$, which is located at a certain distance— say five hundred meters—in the rear of the train. The pedal $a$ which is facing the other raises in the same way a stud $c'$ at the same distance in front of the train. If now a train comes behind the first and at a greater speed, there is a risk of a collision. It will be the same also if the first train should break down on the line.

In the case of a train fitted up with the Westinghouse brake the lever $d$ comes in contact with the stud $c'$ which is up, and, striking against it, it oscillates and opens the tap $e'$. The piping of the brake is thus opened, and all the brakes of the carriages of the train coming behind the first act immediately and cause the stoppage of this second train and so avoid a bumping.

In the case of a single line and even in the case of ordinary lines it is necessary to stop the trains going against each other on the same line. This result is also obtained by the system which is the object of this invention, as at the same time that a stud $c'$ goes up behind a train going along or disabled on the line another stud $c'$ also goes up in front of this train, so that if another train comes toward it the studs which are up in front will actuate the brakes and stop this train; but we must observe that this second train will also actuate studs in front of it and which will bring about the working of the brakes of the first train, if this latter is going. Consequently if two trains go toward each other they will be automatically stopped by passing over the pedals $a$ $a$.

In the case of a Westinghouse brake the lever $d$ is brought back to its normal position after striking the stud $c'$ by a spring $d'$, and the engine-driver can shut the tap $e'$ and release the brakes to continue his journey. In the case of brakes with cables it is necessary that the lever $f$ located on the hind part of the carriage and which by going over the stud $c'$ causes one of the cables of the brake to tighten up should remain in the oblique position given to it after the said lever $f$ has got over the stud $c'$ as otherwise the tension of the cable would cease immediately and the brake of each carriage would be acting only during the short time that the lever $f$ was going over the stud $c'$, which would not be sufficient to cause the stoppage of the train. To keep the lever in its oblique position, this latter is so adjusted as to move along another lever $g$ with a knob $g'$. The lever $f$ goes over this knob, and then the lever $g$ is pushed by a spring $g^2$, so that the knob comes in such a position that it will not allow the lever $f$ to go back to its original position, and the cables of the brakes of all the carriages are thus kept tightened and the train stops.

To slacken the cables, the guard of the train will have to push down all the levers $g$ by compressing the springs $g^2$, so that they will allow the levers $f f$ to go back to their vertical position; but the engine-driver can also release these levers by a mechanism shown in Figs. 2 and 3. This mechanism consists of a hand-wheel $h$, mounted on a vertical spindle and carrying at its lower end a bevel-wheel $h'$, gearing with another bevel-wheel $h^2$. This latter is mounted on a shaft $h^3$, connected by a universal or "Cardan" joint $h^4$ to a shaft $h^5$. One of the flanges of the universal joint is rigidly connected with a socket $h^6$, inside which can slide without turning the shaft $h^5$, which is also connected, by means of a universal joint $h^7$, to a shaft $h^8$, placed under the framework of the first carriage. This shaft is also connected, by means of a universal joint, to another shaft $h^8$, placed under the second carriage, and so on up to the last carriage of the train. On each shaft $h^8$ and at each end are mounted drums $h^9$ and $h^{10}$, on which are wound cables attached to the levers $g$, so that when the engine-driver turns his hand-wheel he causes all the shafts $h^8$ to turn, and the cables by winding on the drums $h^9$ or $h^{10}$ cause the levers $g$ to oscillate and release the levers $f$.

It will be noted that when the train is going forward it is the levers $f$ placed on the hind part of the carriages which actuate the brakes, whereas the levers $f$ placed in the front oscillate when passing over the studs $c'$, but produce no effect. Should the carriages proceed in the reverse way, it would be these latter levers $f$ which would actuate the brakes, and the others would have no effect. It is obvious that the levers $f$ and $f$ of the front and the hind part of each carriage are not placed in the same vertical plane. One is on the right and the other on the left of the longitudinal axis of the carriage. Also the studs $c'$ which bring about the stoppage of the trains going in one direction are not in the same axis as the studs $c'$ which cause the stoppage of the trains going in the reverse direction, as shown clearly by Fig. 4. It is easy to see also that the studs $c'$ which go up at the back of a train going over pedals $a$ rise and incline oppositely to studs $c'$ which rise in advance of the train and are arranged to operate the brakes according to the direction of movement of the trains.

It will be observed that the levers $b$, worked by the pedals $a$, do not act by traction on the cables $b'$ when a train is going over. On the contrary, they slacken these cables, so that the springs $c^2$ should cause the corresponding studs $c'$ to rise. In this way there is no abrupt effect which might break the cables, as would be the case if the levers $b$ acted by traction on the cables to cause the studs to rise.

After the passage of the train the springs $a'$ bring up the pedals $a$, and it is then that the levers $b$ operate the cables $b'$ with a traction powerful enough to compress the springs $c^2$ and bring down the studs $c'$. It is therefore necessary that the springs $a' a'$ should be more powerful than the springs $c^2$. These latter must, however, be strong enough not to give way when the levers $d$ or $f$ go over them. The pedals $a$ must be long enough so that at least two of the consecutive wheels of a carriage should always cover them, so to avoid that these pedals should go down on one side only at the same time.

If two trains are going in the same direction on the same line and at different speeds and if the train in front should go at a slower speed than the train behind, it will happen that when the trains are still at a certain distance from each other the train in front will bring up behind it studs $c'$; but these studs will still be too far away from the second train and will produce no effect on it; but as the pedals are so placed that when a train leaves one it immediately finds another one in front at one time or the other the second train is bound to meet studs $c'$ which are up and will stop it when it is at a certain distance from the first train, since the studs $c'$ have between them the same distances as the pedals $a a$. This applies equally well to two trains going in opposite directions on the same line.

It is therefore shown that with this system collisions between trains and bumpings are practically impossible, as explained above.

What I claim is—

1. The combination, in apparatus for automatically stopping railway-trains, of two series of pedals $a$ at regular intervals along the rails and facing each other, springs normally supporting said pedals and adapted to return them after they have been depressed, levers $b$ connected to pedals $a$ and pivoted, cables $b'$ extending from levers $b$, two series of levers $c$ to which said cables are connected and having studs or arms $c'$, springs adapted to raise studs $c'$ when the cables are operated by depression of their pedals into position to be struck by a brake-operating arm on a passing train, pedals $a$ of one series being connected ahead to levers $c$ of the corresponding series, and the pedals $a$ of the other series being connected to the rear to levers $c$ of their corresponding series.

2. The combination, in apparatus for automatically stopping railway-trains, of two series of pedals $a$ at regular intervals along the rails and facing each other, springs normally supporting said pedals and adapted to return them after they have been depressed, levers $b$ connected to pedals $a$ and pivoted, cables $b'$ extending from levers $b$, two series of levers $c$ to which said cables are connected and having studs or arms $c'$, springs adapted to raise studs $c'$ when the cables are operated by depression of their pedals into position to be struck by a brake-operating arm on a passing train, pedals $a$ of one series being connected ahead to levers $c$ of the corresponding series, and the pedals $a$ of the other series being connected to the rear to levers $c$ of their corresponding series, brake-operating means on a car, and a depending brake-operating lever adapted to be operated by studs $c'$ of one series when the studs are raised.

3. The combination, in apparatus for automatically stopping railway-trains, of a line of rails, spring-supported pedals $a$ at intervals along the rails, brake-operating studs or levers also at intervals along the rails, levers operated by depression of the pedals, cables connecting said levers forward or to the rear to a brake-operating stud.

4. The combination, in apparatus for automatically stopping railway-trains, of a line of rails, spring-supported pedals $a$ at intervals along the rails, brake-operating studs or levers also at intervals along the rails, levers operated by depression of the pedals, cables connecting said levers forward or to the rear to a brake-operating stud, a car, a brake and means for applying it on said car, and a depending operating-arm adapted to coöperate with the studs when raised to cause the brakes to be applied.

5. The combination, in apparatus for automatically stopping railway-trains, of a line of rails, spring-supported pedals $a$ at intervals along the rails, brake-operating studs or levers also at intervals along the rails, levers operated by depression of the pedals, cables connecting said levers forward or to the rear to brake-operating studs, a car, a brake, means for applying it on said car, a depending operating-arm adapted to coöperate with the studs when raised to cause the brakes to be applied, and means for maintaining the brake applied after being set, as described.

Signed at Paris, France, this 24th day of October, 1899.

LOUIS ROUSSEAU.

Witnesses:
J. ALLISON BOWEN,
ABELEN JULIEN.